Patented Mar. 11, 1930

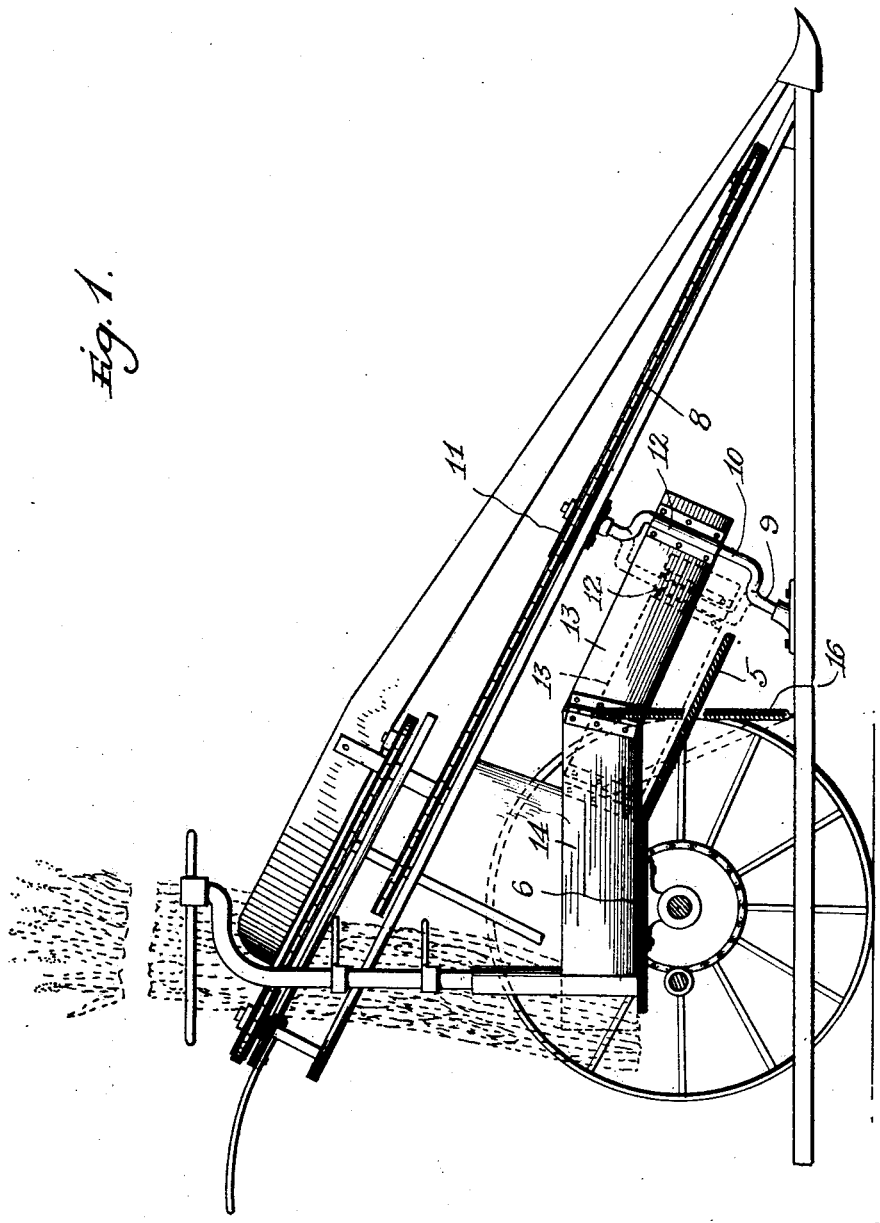

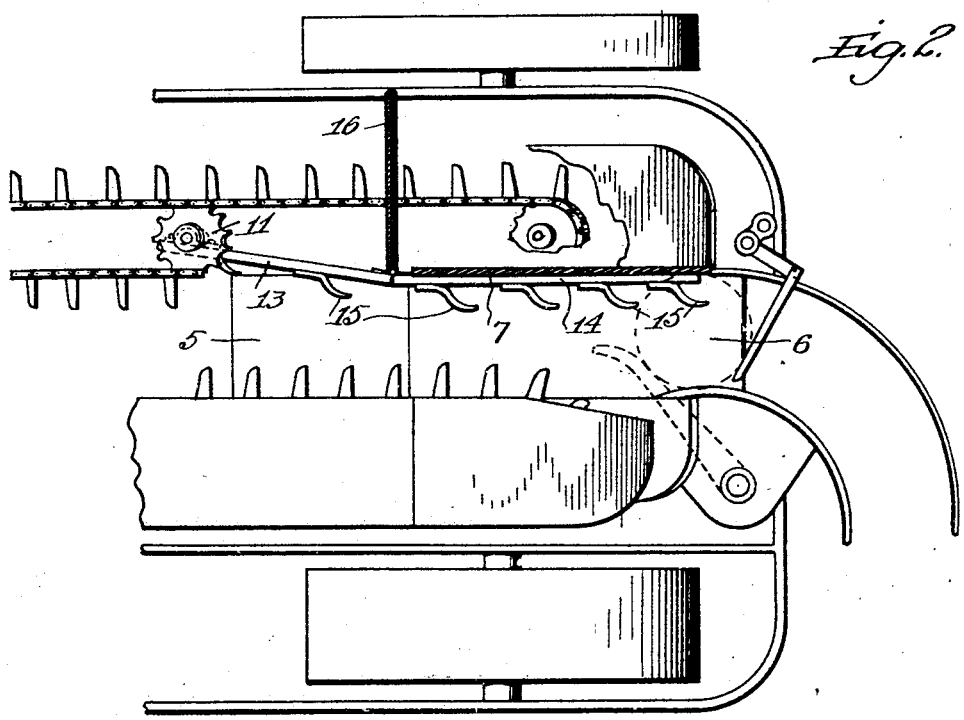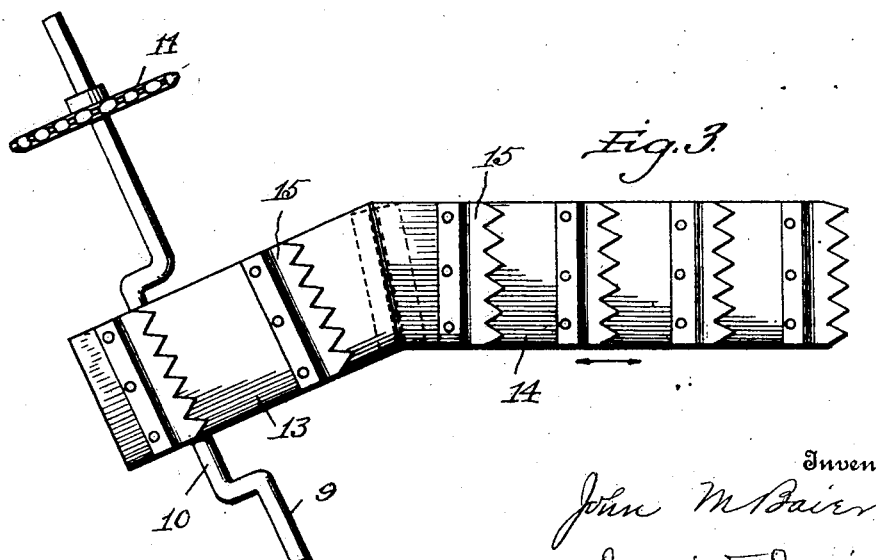

1,749,749

UNITED STATES PATENT OFFICE

JOHN M. BAIER, OF OLMSTED COUNTY, MINNESOTA, ASSIGNOR OF ONE-HALF TO WILLIAM H. H. GREENE, OF ROCHESTER, MINNESOTA

CORN HARVESTER

Application filed November 26, 1927. Serial No. 235,985.

My invention relates to corn harvesters of the well-known vertical type by which corn is cut and conveyed upwardly and rearwardly to a binding mechanism where it is bound into bundles while in a vertical position, and my invention has for its special object to provide simple means for not only assisting the cut corn stalks in being moved up to the binder-deck, but also insuring the ejection of the bound bundles, as more fully hereinafter set forth.

In the drawing—

Fig. 1 is a vertical sectional view of a portion of a corn harvester showing my invention applied thereto;

Fig. 2 is a view partly in plan and partly in horizontal section of the same;

Fig. 3 is a detail side elevation of my attachment removed from the machine.

The corn harvester upon which my device is employed is well known in the art, and I have shown only so much of the machine as is necessary to illustrate the application of my invention to the harvester, it being well understood that the corn is cut and conveyed up to the binding mechanism, made into bundles and tied while in a vertical position, the operative power being produced by the traction of one or more of the transportation wheels of the harvester, the power being transmitted to the cutting, conveying and binding mechanism in a well known manner.

Referring to the drawing annexed by reference-characters, 5 designates a portion of the bottom of the trough up which the erect corn-stalks pass as they go to the binder-deck 6, one side board 7 of the binder-deck being shown. One of the two usual chains 8 for presenting the stalks to the cutter (not shown) and for elevating them up the trough-bottom 5 is illustrated, and it is from this chain 8 that I take off the power needed for operating my attachment. I mount in the frame a shaft 9 provided with a crank 10 at a point between its ends, the two ends being journalled in adjacent parts of the machine and the upper end being provided with a sprocket-wheel 11 in constant mesh with the chain 8, whereby the crank-shaft 9 is continuously driven while the corn harvester is in operation.

Pivotally attached to the crank 10 by a bearing 12 is a board or plate 13, and hinged to the upper, forward end of this plate 13 is another plate 14 which has its lower edge resting on the binder-deck 6 and its outer face bearing against the inner face of the vertical wall 7. The plate 14 lies at an obtuse angle to the plate 13, so as to slide straight forwardly and backwardly on the binder-deck. Both the plates 13 and 14 are provided with stalk-engaging toothed flanges 15 which project inwardly into the elevating-troughs and face rearwardly. A coil-spring 16 is connected at one end to the plates 13 and 14 at their hinged connection and at its other end to an adjacent part of the frame, so as to normally pull the hinged joint outwardly to thus keep plate 14 against the wall 7 during the operation of the device.

In operation, the crank 10 imparts an orbital movement to plate 13, which movement swings its forward end inwardly and forwardly on the working-stroke and then outwardly and backwardly on the non-working stroke. This movement pushes the plate 14 forwardly and backwardly on the binder-deck, as stated. Lifting of the plate 14 off the binder-deck is prevented by providing for a vertical sliding movement of the plate 13 on the crank 10 during the operation thereof. This plate 13 is journalled loosely on the crank and is therefore free to slide up and down on the crank as the shaft rotates. The plate 13, therefore, not only has an orbital movement, but has an edgewise vertical movement, and the lifting of the plate 14 off the binder-deck is further provided against by inclining the spring 16 outwardly and downwardly. The plate 13 with its stalk-engaging device 15 assists in elevating the cut stalks up the usual trough or channel while the plate 14 insures movement of the stalks of corn after they reach the binder-deck. This plate 14 extends to the back end of the binder-deck and terminates under the usual binding mechanism, a part of which is illustrated in the drawing. This plate 14 co-operates with the usual ejecting mechanism for the corn-stalks that engages the upper parts of the stalks. This plate 14 not only engages the unbound stalks, but also the bound stalks, so that it assists not only in getting the stalks together for binding purposes, but also in ejecting the bound bundles.

In ordinary corn fields, weeds grow quite luxuriantly and when the corn is harvested a good many of the weeds are entangled or entwined with the butts of the corn and so are fed along into the machine with the corn. This has always been a serious source of trouble in harvesting corn by machinery, for the weeds are drawn out by the endless feeding-chains for feeding along the butts of corn and become entangled or wound around the operating parts of the machine, especially the chains, sprocket-wheels and shafts, thus clogging the machine and making it necessary for the driver at frequent intervals to stop the machine, get down from his seat and cut or tear away the weeds from the operating parts of the machine. This choking of the corn in the binder mechanism is further promoted by short corn-stalks. It is the object of my invention particularly to insure the kicking off of the tied bundle. The ordinary ejecting mechanism works all right with corn of uniform size and not mingled with weeds, but when stalks of ununiform size—especially where entangled with weeds—get on to the binder-deck, the bundles so choke the bundle-channel that the ordinary ejecting mechanism will not eject the tied bundles. With my device, prompt delivery of the tied bundles is insured. In fact, in the actual operation of the device I have found that my pusher-plate 14, working straight back against one side of the binder-trough, actually speeds up the butt-end of the bundle a little ahead of the regular, usual ejecting device and renders clogging of the bundle in the channel impossible.

What I claim as new is:

1. In combination with a corn harvester having a frame and elevating-chains, said corn harvester also having a walled binder-deck, a crank-shaft mounted in the frame and means for driving the same through the medium of one of the elevating-chains, a stalk-pushing plate pivotally connected to the crank, and a bundle-pushing plate pivotally connected to the forward end of said stalk-pushing plate and extending backwardly so as to rest upon the binder-deck and also against the side wall thereof.

2. In a corn harvester having a binder-deck whose wall assists in forming a binder-throat, a stalk-gathering and bundle-pushing device resting upon the binder-deck and lying against one wall of the binder-throat in position to engage the sides of the adjacent stalks and the bundles, means for reciprocating said stalk-gathering and bundle-pushing device, and means to hold said stalk-gathering and bundle-pushing device against said wall during reciprocations.

3. In a corn harvester of the type set forth having a binder-deck, a bundle-pusher lying upon the binder-deck and provided with stalk-engaging devices on its inner face, a stalk-engaging device hingedly connected to the forward end of the bundle-pusher, a spring for normally pulling this hinged joint outwardly, and a crank-shaft mechanism for giving an orbital movement to the stalk-pushing device.

4. In combination with a corn harvester of the type set forth having a frame and a walled binder-deck, a crank-shaft mounted in the frame and means for driving the same, a stalk-pushing plate pivotally and slidingly connected to the crank, and a bundle-pushing plate pivotally connected to the forward end of said stalk-pushing plate and extending backwardly so as to rest against the side wall of said binder-deck.

5. In a corn harvester having a binder-deck and bundle-tying devices, a stalk-gathering and bundle-pushing device engaging the sides of the stalks and the bundles and extending rearwardly to the position occupied by the tied bundle, and means for reciprocating said stalk-gathering and bundle-pushing device while the stalks are being gathered and tied.

6. In a corn harvester of the type set forth, having a binder-deck provided with a wall forming a binder-throat, a bundle-pushing device resting upon the binder-deck and lying against one wall of the binder-throat, means for reciprocating this bundle-pushing device, and means for normally holding the bundle-pushing device against said wall during reciprocations.

7. In a corn harvester of the type set forth, having a binder-deck provided with a wall forming a binder-throat, a bundle-pusher lying upon the binder-deck and provided with stalk-engaging devices on its inner face, adapted to engage the sides of the stalks, a stalk-engaging device hingedly connected to the forward end of the bundle-pusher and provided with devices for engaging the sides of the stalks, a spring for normally pulling this hinged joint outwardly and downwardly to thereby normally hold the bundle-pusher against the binder-deck and also against the side wall of the binder-deck, and a crank mechanism for giving an orbital movement to the stalk-pushing device and a reciprocating movement to the bundle-pusher.

In testimony whereof I hereunto affix my signature.

JOHN M. BAIER.